(12) United States Patent
Lee et al.

(10) Patent No.: US 8,169,603 B2
(45) Date of Patent: May 1, 2012

(54) LENS-TESTING APPARATUS AND LENS-TESTING METHOD HAVING A PLURALITY OF COMBINATIONS OF OBJECT DISTANCES

(75) Inventors: Chang Yuan Lee, Hsin Chu County (TW); Wen Wen Teng, Hsin Chu City (TW); Chungying Kuo, Hsin Chu City (TW)

(73) Assignee: UMA Technology Inc., Jubei (TW)

( * ) Notice: Subject to any disclaimer, the term of this patent is extended or adjusted under 35 U.S.C. 154(b) by 504 days.

(21) Appl. No.: 12/541,736

(22) Filed: Aug. 14, 2009

(65) Prior Publication Data
US 2010/0165329 A1   Jul. 1, 2010

(30) Foreign Application Priority Data
Dec. 31, 2008   (TW) .............................. 97151537 A

(51) Int. Cl.
  G01B 9/00   (2006.01)
  G01B 11/02  (2006.01)
  G01N 21/00  (2006.01)
(52) U.S. Cl. ........ 356/124; 356/125; 356/126; 356/127; 356/239.2; 356/515
(58) Field of Classification Search .......... 356/124–127, 356/239.1–239.8, 515
See application file for complete search history.

(56) References Cited

U.S. PATENT DOCUMENTS

| | | | | |
|---|---|---|---|---|
| 4,588,270 | A * | 5/1986 | Tamaki | 351/212 |
| 5,847,819 | A * | 12/1998 | Yanagi | 356/124 |
| 6,118,528 | A * | 9/2000 | Yanagi | 356/246 |
| 7,443,492 | B2 * | 10/2008 | Chang | 356/124 |
| 2007/0279620 | A1 * | 12/2007 | Robrish | 356/124.5 |
| 2010/0195093 | A1 * | 8/2010 | Ho et al. | 356/124 |

FOREIGN PATENT DOCUMENTS

| | | |
|---|---|---|
| TW | I274169 | 2/2007 |
| TW | I282900 | 6/2007 |
| TW | I288838 | 10/2007 |

\* cited by examiner

*Primary Examiner* — Gregory J Toatley
*Assistant Examiner* — Jarreas C Underwood
(74) *Attorney, Agent, or Firm* — Muncy, Geissler, Olds & Lowe, PLLC

(57) ABSTRACT

One embodiment of the invention provides a lens-testing apparatus being used for testing a lens device. The lens-testing apparatus comprises a light module, at least one first and second image sensors, and at least one image sensor module. The light module generates a patterned light beam passing the lens device. The first and second image sensors receive first and second portions of the patterned light beam; the first image sensor is disposed between the second image sensor and the lens device. The image sensor module receives a substantially parallel third portion of the patterned light beam, and comprises a third image sensor and a collimator. The third portion of the patterned light beam is focused onto the third image sensor by the collimator; the distance between the first image sensor and the lens device is smaller than the distance between the second image sensor and the lens device.

20 Claims, 12 Drawing Sheets

LENS-TESTING APPARATUS AND LENS-TESTING METHOD HAVING A PLURALITY OF COMBINATIONS OF OBJECT DISTANCES

BACKGROUND OF THE INVENTION (a) Field of the Invention

The invention relates to a lens-testing apparatus and a lens-testing method for testing a lens device, and more particularly, to a lens-testing apparatus and a lens-testing method for generating a plurality of combinations of object distances to test a lens device.

(b) Description of the Related Art

A lens device is wildly applied in optical devices, such as digital camera. During the manufacturing process, the quality of the lens device varies with the manufacturing difference. As a result, before delivered out of the factory, the lens device should be tested to confirm that the lens device can conform to the specification of original design.

FIG. 1 shows a schematic diagram illustrating a conventional light box for testing a lens device. Referring to FIG. 1, the light box 10 comprises a housing 11 and a loading platform 12, a light source 13, at least one image sensor 14, a host computer 15, a test chart 16 and a lens device 17 which are disposed in the housing 11. For testing different properties of the lens device 17, different test charts 16 may be used. For example, during the test, light from the light source 13 shed on the test chart 16 passes through the lens device 17 and then is shed on the image sensor 14. The image sensor 14 captures an image and transmits it to the host computer 15. The host computer 15 is used to analyze the image captured and then the property of an image sensor 14 such as resolution, optoelectronic conversion function (OECF), gray value, modulation transfer function (MTF), spatial frequency response, etc. may be obtained.

However, the conventional light box 10 only can examine the lens device 17 at an object distance at a time. If the lens device 17 is requested to be examined at different object distances, a transmission device 18 should be provided in the conventional light box 10 to change the distance between the image sensor 14 and the lens device 17. In addition, when the conventional light box 10 is used to examine a lens device at a large viewing angle or at a long object distance, it has to have a huge volume. Furthermore, the place for containing it has also to be a big space, so that the place is limited and the space thereof is wasted.

BRIEF SUMMARY OF THE INVENTION

In light of the above-mentioned problems, one object of an embodiment of the invention is to provide a lens-testing apparatus and a lens-testing method which use a plurality of combinations of object distances to examine a lens device. One object of an embodiment of the invention is to provide a lens-testing apparatus having a relatively compact volume. One object of an embodiment of the invention is to provide a lens-testing method used in a lens-testing apparatus so that the lens-testing apparatus may have a relatively compact volume.

One embodiment of the invention provides an lens-testing apparatus being used for testing a lens device. The lens-testing apparatus comprises a light module, at least one first image sensor, at least one second image sensor and at least one image sensor module. The light module is for generating a patterned light beam passing the lens device. The first image sensor is for receiving a first portion of the patterned light beam; the second image sensor is for receiving a second portion of the patterned light beam; the first image sensor is disposed between the second image sensor and the lens device. The image sensor module is for receiving a substantially parallel third portion of the patterned light beam, and comprises a third image sensor and a collimator. The substantially parallel third portion of the patterned light beam is focused onto the third image sensor by the collimator; the distance between the first image sensor and the lens device is smaller than the distance between the second image sensor and the lens device.

In one embodiment, the lens-testing apparatus further comprises at least one reflector disposed between the second image sensor and the lens device. The second portion of the patterned light beam is reflected by the reflector before received by the second image sensor.

One embodiment of the invention provides an lens-testing method being for testing an lens device, the lens-testing method comprising: (a) controlling a light module to generate a patterned light beam passing through the lens device, wherein a first portion of the patterned light beam is shed on a first image sensor; a second portion of the patterned light beam is shed on a second image sensor; and a substantially parallel third portion of the patterned light beam is shed on a image sensor module, wherein the image sensor module is used for simulating an object distance at infinity between the image sensor module and the lens device; and (b) using the first image sensor, the second image sensors and the image sensor module to capture the images corresponding to the patterned light beam, and analyzing the images to obtain the properties of the lens device.

Other objects and advantages of the invention can be better understood from the technical characteristics disclosed by the invention. In order to clarify the above mentioned and other objects and advantages of the invention, examples accompanying with figures are provided and described in details in the following.

DETAILED DESCRIPTION OF THE INVENTION

The above and other technical content, characteristics, and functions of the invention will be described in details with reference to the drawings. For clarity, the wording related to direction, such as up, down, left, right, front, back, etc., used in examples is referred to the direction with respect to the drawings. Therefore, the wording related to direction is not used to limit the scope of the invention.

Figure 1:
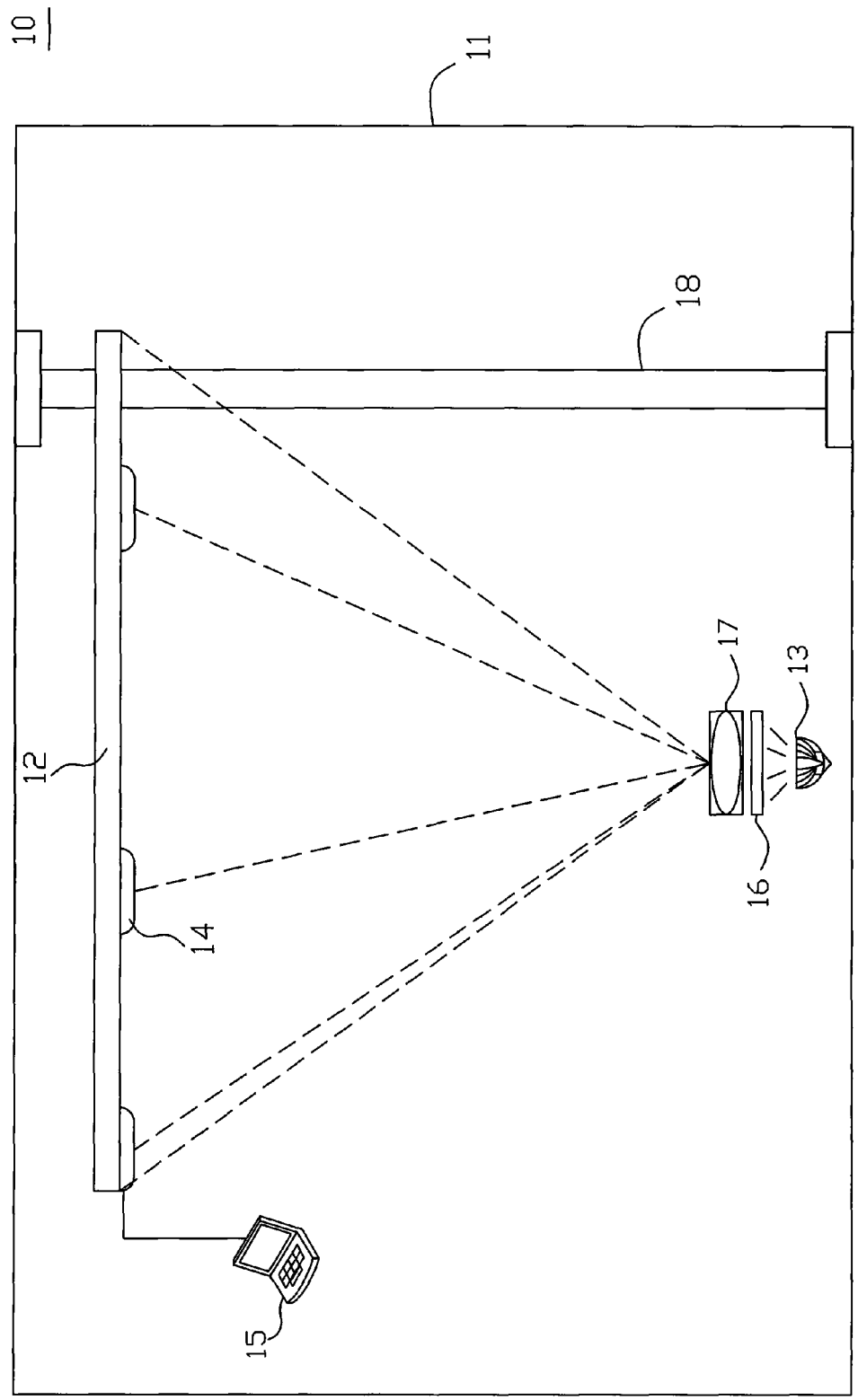
FIG. 1 shows a schematic diagram illustrating a conventional light box for testing a lens device.
Figure 2:
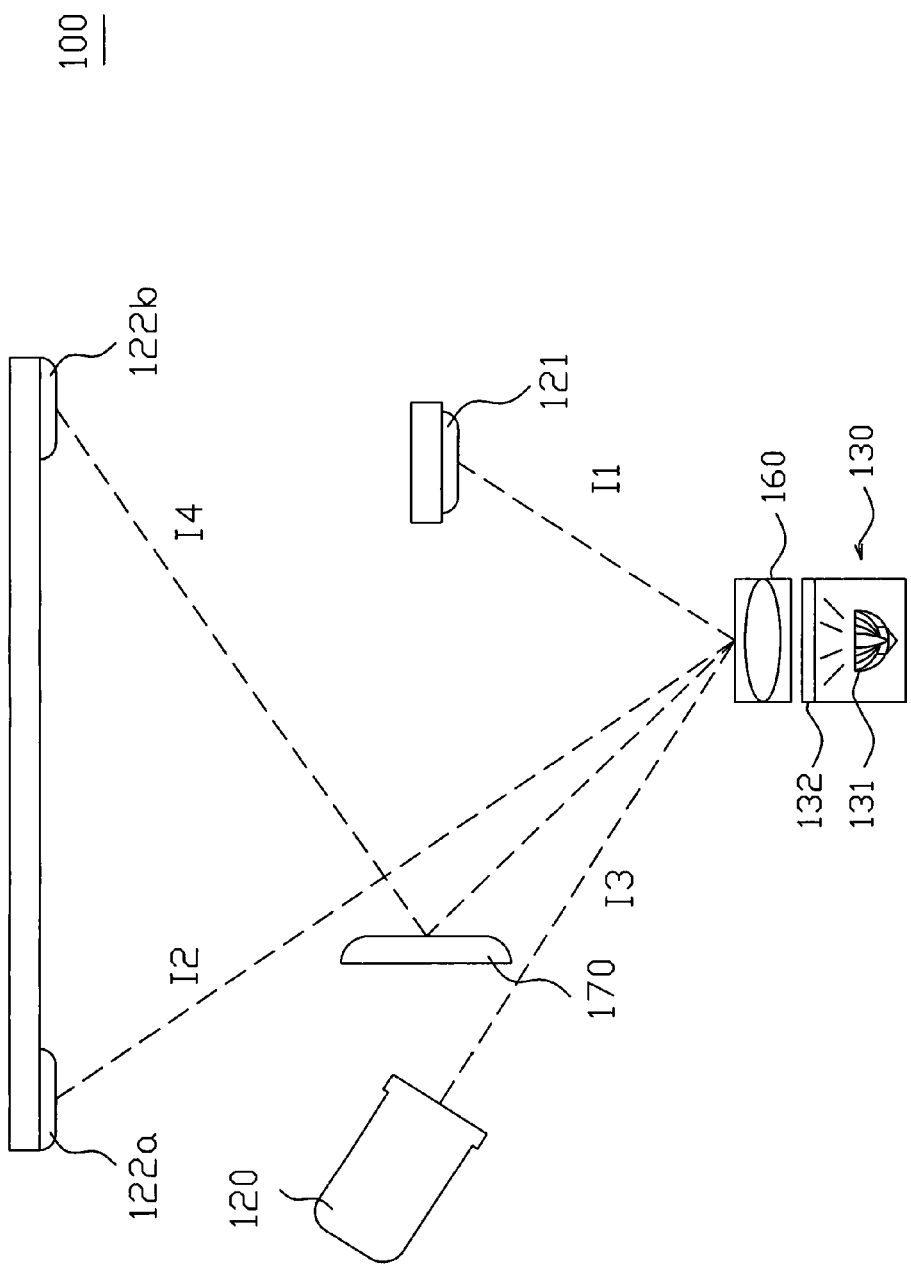
FIG. 2 shows a schematic diagram illustrating a lens-testing apparatus having a plurality of combinations of object distances according to one embodiment of the invention.

FIG. 2 shows a schematic diagram illustrating a lens-testing apparatus having a plurality of combinations of object distances according to one embodiment of the invention. Referring to FIG. 2, the lens-testing apparatus 100 having a plurality of combinations of object distances includes a first image sensor 121 having a short object distance, a second image sensor 122a having a medium object distance and a third image sensor module 120 having a long object distance, a light module 130 and a lens device 160. The lens device 160 is disposed between the light module 130 and the first image sensor 121, the second image sensor 122a and the third image sensor module 120 respectively. The distance between the second image sensor 122a and the lens device 160 is an object distance D2. The distance between the first image sensor 121 and the lens device 160 is an object distance D1. The object distance D2 is longer than the object distance D1. The light module 130 generates a patterned light beam. After passing through the lens device 160, a first portion I1, a second portion I2 and a third portion I3 of the patterned light beam are respectively shed on the first image sensor 121, the second image sensor 122a and the third image sensor module 120.

Figure 3:
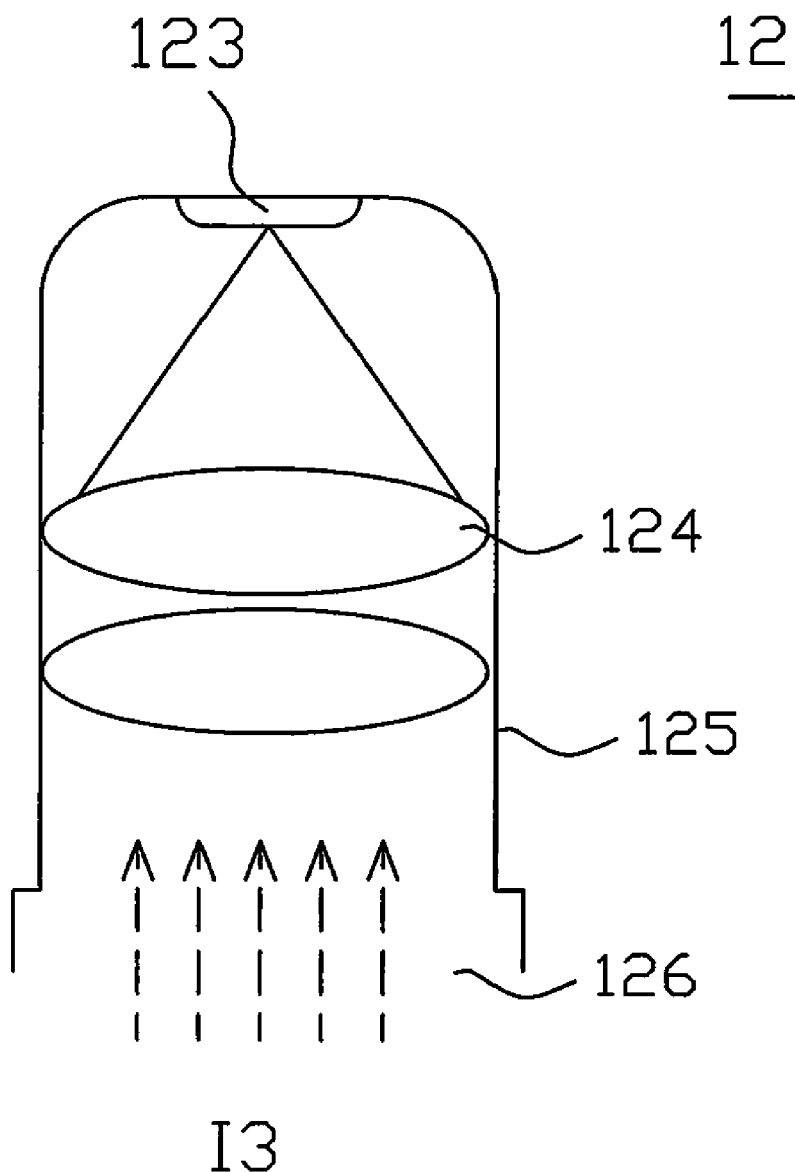
FIG. 3 shows a schematic diagram illustrating a image sensor module having a long object distance according to one embodiment of the invention.

FIG. 3 shows a schematic diagram illustrating a image sensor module according to one embodiment of the invention. Referring to FIG. 3, the third image sensor module 120 comprises a housing 125, a third image sensor 123 having a long object distance and a collimator 124. The third image sensor 123 and the collimator 124 are disposed in the housing 125 defining an opening 126. The collimator 124 is disposed between the third image sensor 123 and the opening 126. A portion of the patterned light beam shed on the third image sensor module 120 passes through the opening 126 and then becomes the third portion I3 of the patterned light beam which is substantially parallel. The substantially parallel third portion I3 is then focused onto the third image sensor 123 by the collimator 124. It is preferred that the third image sensor 123 is disposed on a focus plane of the collimator 124. As a result, the collimator 124 can simulate an object distance at infinity between the third image sensor 123 (the third image sensor module 120) and the lens device 160. The first image sensor 121, the second image sensor 122a and the third image sensor 123 respectively receive the first portion I1, the second portion I2 and the third portion I3 of the patterned light beam to capture images. The images may be analyzed by a control system to obtain the properties of the lens device 160.

In one embodiment, the lens-testing apparatus 100 may further comprises a reflector 170 and a second image sensor 122b. The reflector 170 is disposed between the lens device 160 and the second image sensor 122b. The light module 130 generates a fourth portion I4 of the patterned light beam which is shed on the reflector 170. The fourth portion I4 of the patterned light beam reflected by the reflector 170 is then shed on the second image sensor 122b. In this embodiment, the requested volume of the lens-testing apparatus 100 is effectively reduced due to the provision of the reflector 170.

In one embodiment, the light module 130 comprises a light source 131 and a test chart 132. The light source 131 generates a light beam. The light beam becomes a patterned light beam after passing through the test chart. In addition, in order to test different properties of the lens device 160, different test charts 132 may be used (as aftermentioned).

Figure 4:
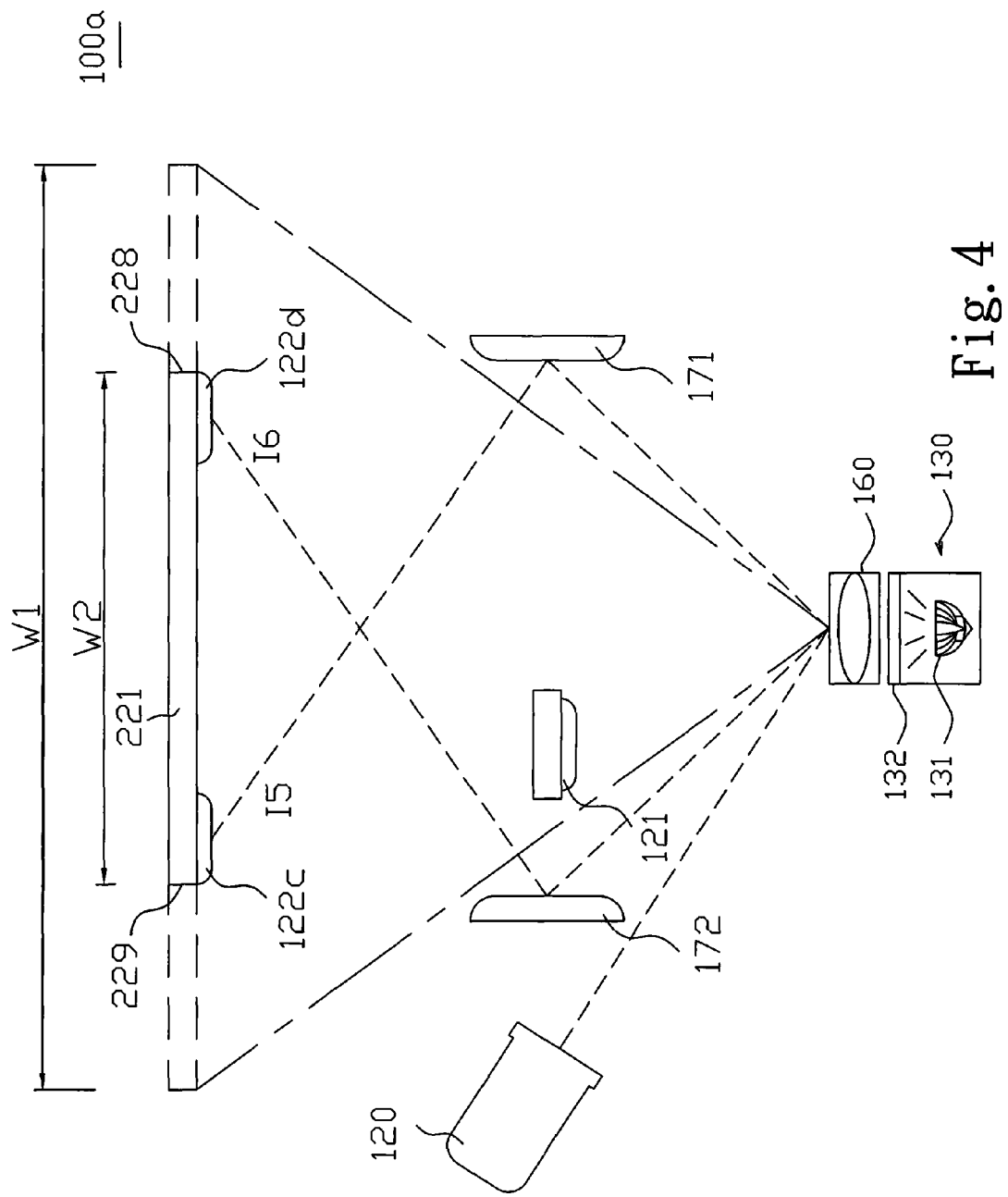
FIG. 4 shows a schematic diagram illustrating a lens-testing apparatus which utilizes at least a reflector according to one embodiment of the invention.

FIG. 4 shows a schematic diagram illustrating a lens-testing apparatus which utilizes at least a reflector according to one embodiment of the invention. The lens-testing apparatus 100a s in FIG. 4 is similar to lens-testing apparatus 100 in FIG. 2, and therefore the same numerical reference designates the same member in these lens-testing apparatus and the descriptions of the same members will be omitted. Only the difference between these lens-testing apparatus will be described in the followings. As shown in FIG. 4, lens-testing apparatus 100a includes a first loading platform 221, a first reflector 171 and a second reflector 172. The first reflector 171 and the second reflector 172 are respectively disposed between the first loading platform 221 and the lens device 160 and are opposite each other. Second image sensors 122c and 122d having a medium object distance are disposed on the first loading platform 221. When the lens device 160 is requested to be examined at a predetermined largest viewing angle and the distance between the first loading platform 221 and the lens device 160 is distance D3, according to prior art, the first loading platform 221 should have a width W1 such that the second image sensors 122c and 122d can receive the light at the predetermined largest viewing angle. In this embodiment, the light module 130 generates a fifth portion I5 of the patterned light beam being shed on the first reflector 171, the fifth portion I5 of the patterned light beam reflected by the first reflector 171 is shed on the second image sensors 122c disposed adjacent to the second end 229 of the first loading platform 221. The light module 130 generates a sixth portion I6 of the patterned light beam being shed on the second reflector 172, the sixth portion I6 of the patterned light beam reflected by the second reflector 172 is shed on the second image sensors 122d disposed adjacent to the first end 228 of the first loading platform 221. The first end 228 is opposite the second end 229. As a result, even though the first loading platform 221 has a width W2 smaller than W1, the second image sensors 122c and 122d may also receive the light from the lens device 160 at the predetermined largest viewing angle. This arrangement may reduce the volume of the lens-testing apparatus 100a.

Figure 5:
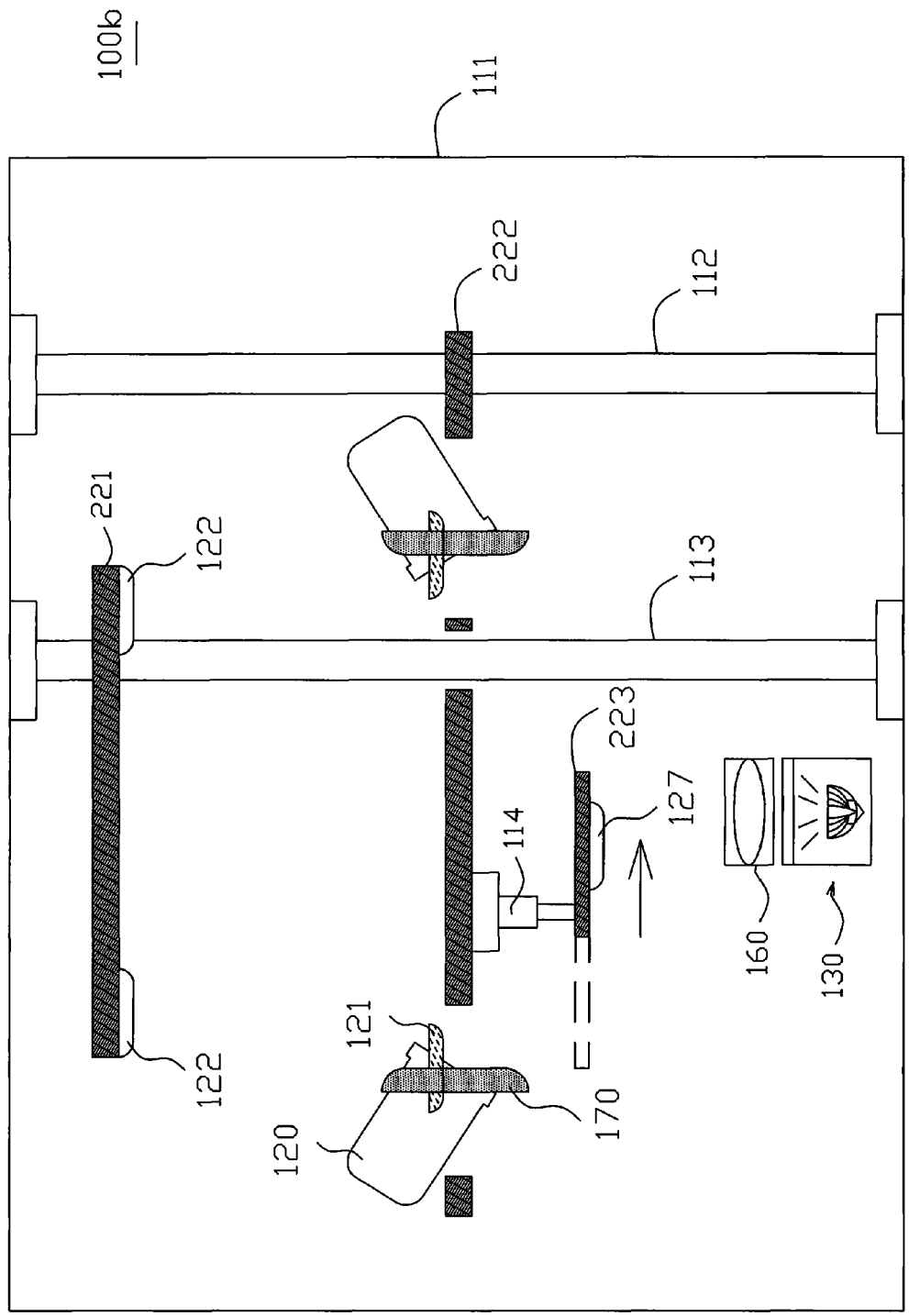
FIG. 5 shows a schematic side view illustrating the inside of a lens-testing apparatus according to one embodiment of the invention.

FIG. 5 shows a schematic side view illustrating the inside of a lens-testing apparatus according to one embodiment of the invention. The lens-testing apparatus 100b in FIG. 5 is similar to lens-testing apparatus 100 in FIG. 2, and therefore the same numerical reference designates the same member in these lens-testing apparatus and the descriptions of the same members will be omitted. Only the difference between these lens-testing apparatus will be described in the followings. In this embodiment, referring to the FIG. 5, the lens-testing apparatus 100b includes a housing 111 and a first displacement-generating device, at least one first image sensor 121 having a short object distance, at least one second image sensor 122 having a medium object distance and at least one third image sensor module 120 having a long object distance, at least one reflector 170, a first loading platform 221, a second loading platform 222, a lens device 160 and a light module 130 which are disposed in the housing 11. The first displacement-generating device is for moving the reflector 170, the first image sensor 121 and the second image sensor 122 relative to the lens device 160. In this embodiment, the displacement-generating device includes a first screw rod 112 and a second screw rod 113. The first screw rod 112 and the second screw rod 113 are secured on the housing 111. The second image sensor 122 is disposed on the first loading platform 221. The first loading platform 221 is movably disposed on the second screw rod 113 so that which the second screw rod 113 may be used to move the second image sensor 122. The first image sensor 121 is disposed on the second loading platform 222 being movably disposed at the first screw rod 112, so that the first screw rod 112 may be used to move the first image sensor 121. The second loading platform 222 is disposed between the lens device 160 and the first loading platform 221, and the distance between the second image sensor 122 and the lens device 160 is longer than the distance between the first image sensor 121 and the lens device 160.

Figure 6:
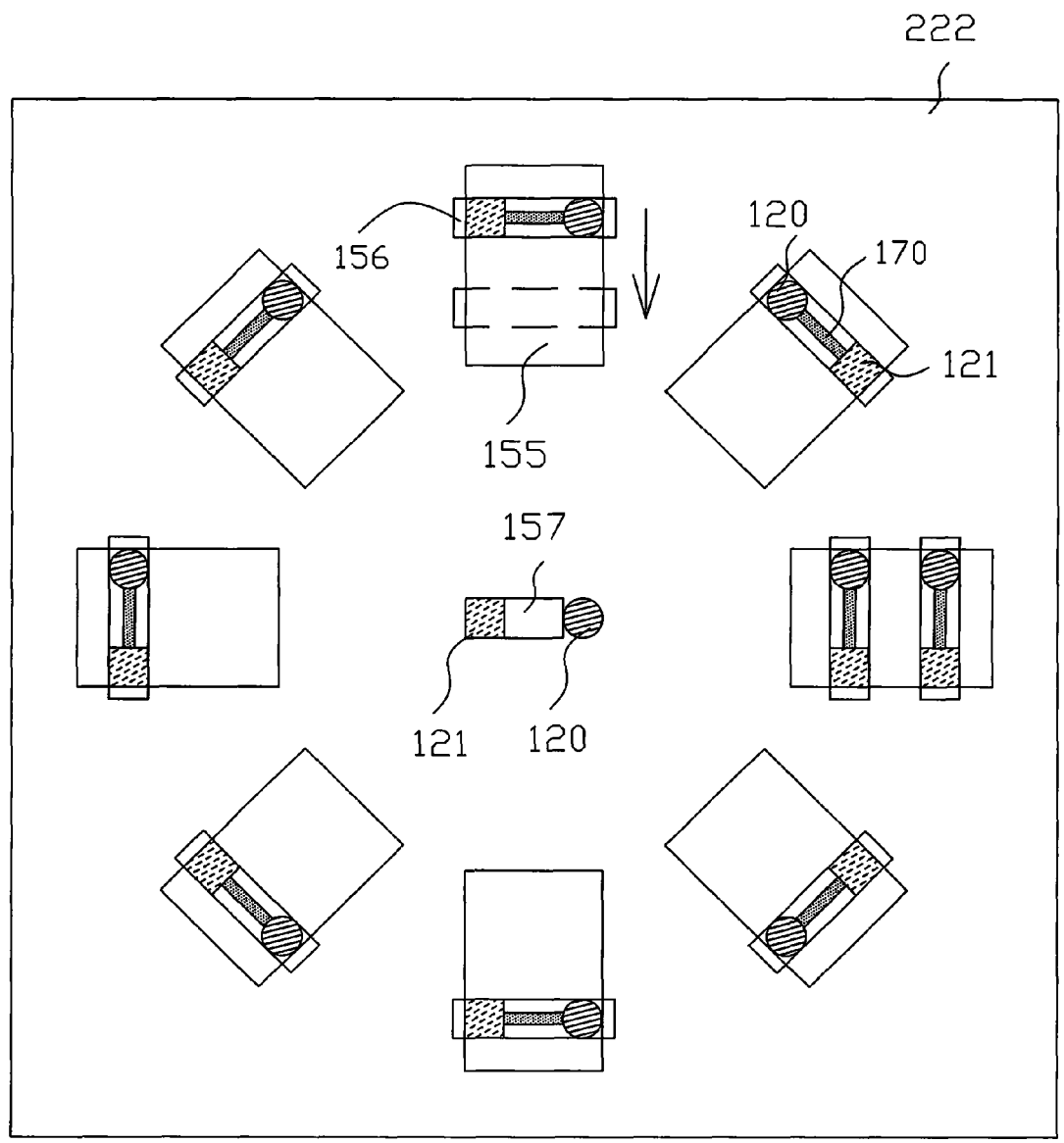
FIG. 6 shows a schematic top view of a loading platform of a lens-testing apparatus according to one embodiment of the invention.

FIG. 6 shows a schematic top view of a loading platform of a lens-testing apparatus according to one embodiment of the invention. The second loading platform 222 includes at least one slide groove 155 and at least one carrier 156. The second loading platform 222 defines the slide grooves 155 which pass through the second loading platform 222. The reflectors 170, the first image sensor 121 and the third image sensor module 120 are secured on the carriers 156. At least one carriers 156 are movably disposed within the slide grooves 155 so that the carriers 156 may be moved within the slide grooves 155 forward or backward relative to the center of the second loading platform 222. Consequently, the lens device 160 may be examined at different viewing angles. A hole 157 is formed at the center of the second loading platform 222, so that the light from the lens device 160 may pass through the hole 157 and then be shed on the second image sensor 122. The slide grooves 155 (the carriers 156) are arranged in pairs and each pair of the slide grooves 155 (the carriers 156) are respectively disposed at the opposite sides of the hole 157. This arrangement can make sure that the first image sensor 121 and the third image sensor module 120 capture a symmetrical combination of images.

Figure 7:
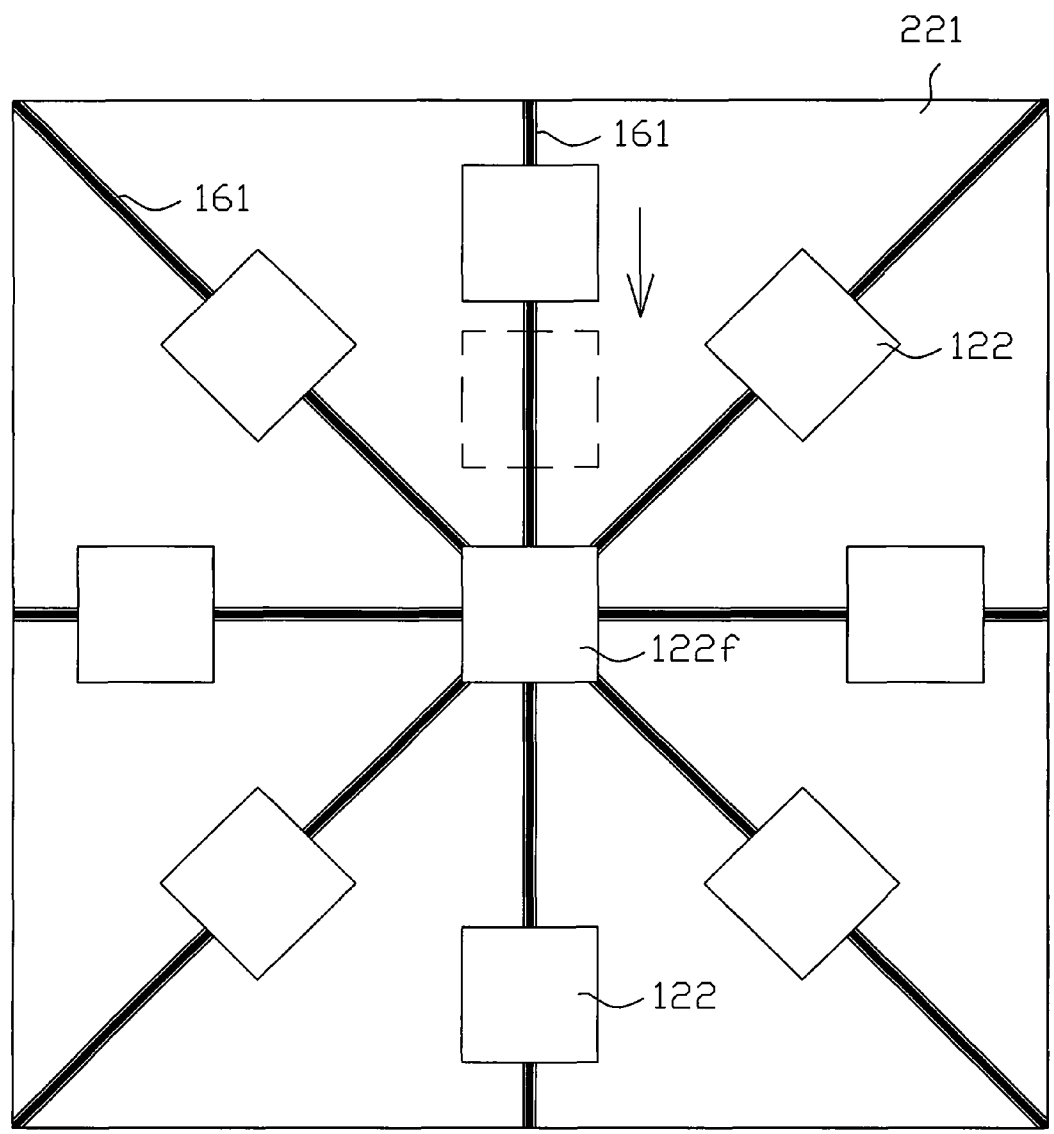
FIG. 7 shows a schematic top view of a loading platform of a lens-testing apparatus according to one embodiment of the invention.

FIG. 7 shows a schematic top view of a loading platform of a lens-testing apparatus according to one embodiment of the invention. The first loading platform 221 includes at least one slide rail 161. At least one second image sensor 122 are movably disposed at the slide rail 161 so that the second image sensor 122 may be moved along the slide rail 161 forward or backward relative to the center of the first loading platform 221. Consequently, the lens device 160 may be examined at different viewing angles. In one embodiment, a second image sensor 122f among the second image sensors 122 is disposed at the center of the first loading platform 221, and the others among the second image sensors 122 are arranged in pairs; each pair of the second image sensors 122 are respectively disposed at the opposite sides of the second image sensor 122f. This arrangement can make sure that the second image sensors 122 capture a symmetrical combination of images.

Referring to FIG. 5, the lens-testing apparatus 100b may further includes a fourth image sensor 127 having a tiny object distance, a third loading platform 223 and a second displacement-generating device 114. The fourth image sensor 127 is disposed on the side surface of the third loading platform 223 adjacent to the lens device 160, and the third loading platform 223 is connected to the second displacement-generating device 114. The second displacement-generating device 114 is disposed on the side surface of the second loading platform 222 adjacent to the lens device 160, and it may optionally move the third loading platform 223 so that the fourth image sensor 127 may be moved to the space between the second loading platform 222 and the lens device 160. The structure of the second displacement-generating device 114 is not limited in the present invention; in one embodiment, the second displacement-generating device 114 may include a motor and a connecting rod (not shown). The third loading platform 223 is secured at the connecting rod. The motor and the connecting rod are connected through a saw teeth structure so that the motor may drive the connecting rod to move forward and backward. In another embodiment, the motor may rotate the connecting rod and drives the third loading platform 223 and the fourth image sensor 127 to rotate so that the fourth image sensor 127 may be optionally located between the second loading platform 222 and the lens device 160.

Figure 8:
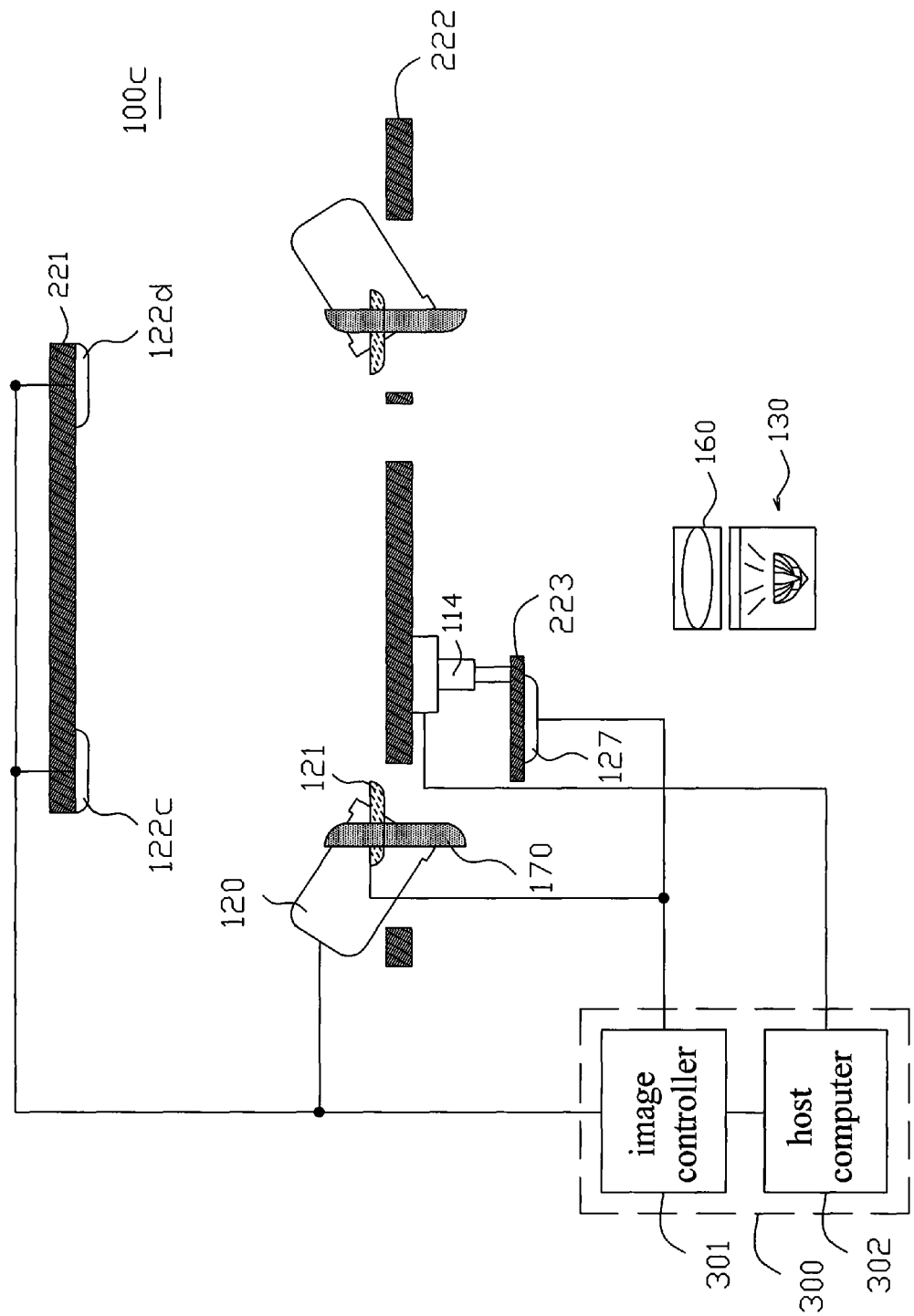
FIG. 8 shows a schematic diagram illustrating a control system of a lens-testing apparatus according to one embodiment of the invention.

FIG. 8 shows a schematic diagram illustrating a control system of a lens-testing apparatus according to one embodiment of the invention, in which the control system is shown by a function block. The lens-testing apparatus 100c having a plurality of combinations of object distances in FIG. 8 is similar to lens-testing apparatus 100b in FIG. 5, and therefore the same numerical reference designates the same member in these lens-testing apparatus and the descriptions of the same members will be omitted. Only the difference between these lens-testing apparatus will be described in the followings. For simplicity, the members such as screw rod are omitted in FIG. 8. In this embodiment, lens-testing apparatus 100c may further includes a control system 300. The control system 300 includes an image controller 301 and a host computer 302. The image controller 301 is coupled to the first image sensor 121, the second image sensor 122, the third image sensor module 120 (third image sensor 123) and the fourth image sensor 127. The host computer 302 may be a computer having calculating functions and is coupled to the image controller 301 and the second displacement-generating device 114. The host computer 302 controls the second displacement-generating device 114 to move the third loading platform 223. The host computer 302 may also receive the images captured by the image sensors through the image controller 301 and then analyze the images to obtain the properties of the lens device 160. The lens-testing apparatus 100c is also controlled by the control system 300 so as to perform a lens-testing method for testing a lens device 160.

Figure 9:
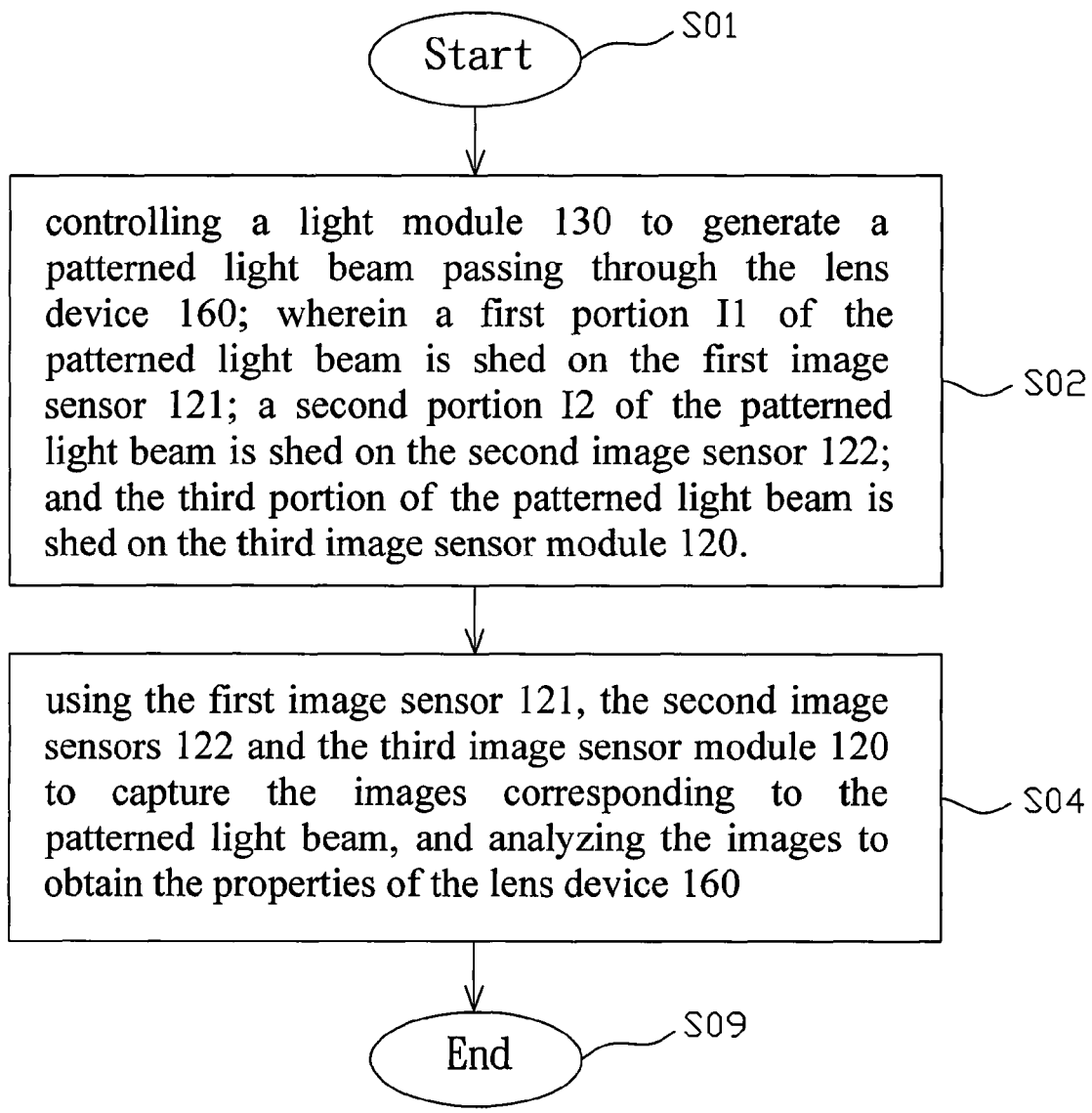
FIG. 9 shows a flow chart illustrating a lens-testing method for testing a lens device according to one embodiment of the invention.

FIG. 9 shows a flow chart illustrating a lens-testing method for testing a lens device according to one embodiment of the invention. The lens-testing method may test the lens device 160 at different viewing angles. The method comprises the following steps.

Step 01: Start.

Step 02: controlling a light module 130 to generate a patterned light beam passing through the lens device 160; wherein a first portion I1 of the patterned light beam is shed on the first image sensor 121; a second portion I2 of the patterned light beam is shed on the second image sensor 122; and the third portion I3 of the patterned light beam is shed on the third image sensor module 120. In one embodiment, the second portion I2 is reflected by the reflector 170 before shed on the second image sensor 122. The third image sensor module 120 can simulate an object distance at infinity between the third image sensor module 120 and the lens device 160.

Step 04: using the first image sensor 121, the second image sensors 122 and the third image sensor module 120 to capture the images corresponding to the patterned light beam, and analyzing the images to obtain the properties of the lens device 160.

Step 09: End.

Figure 10A:
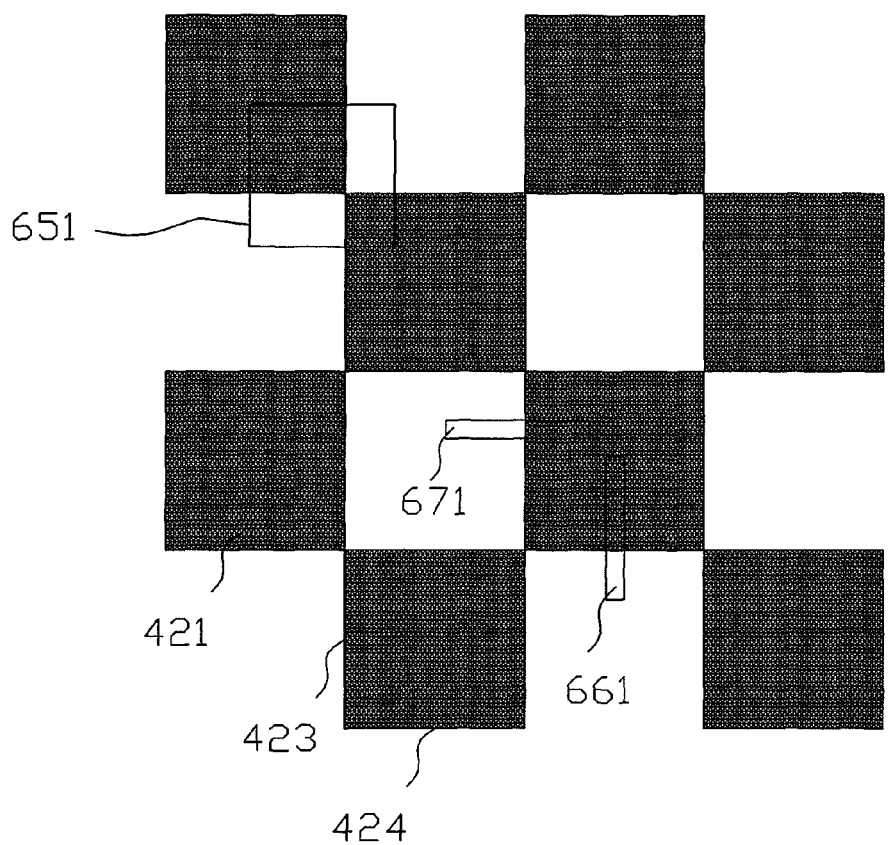
FIG. 10A shows a test chart according to one embodiment of the invention.
Figure 10B:
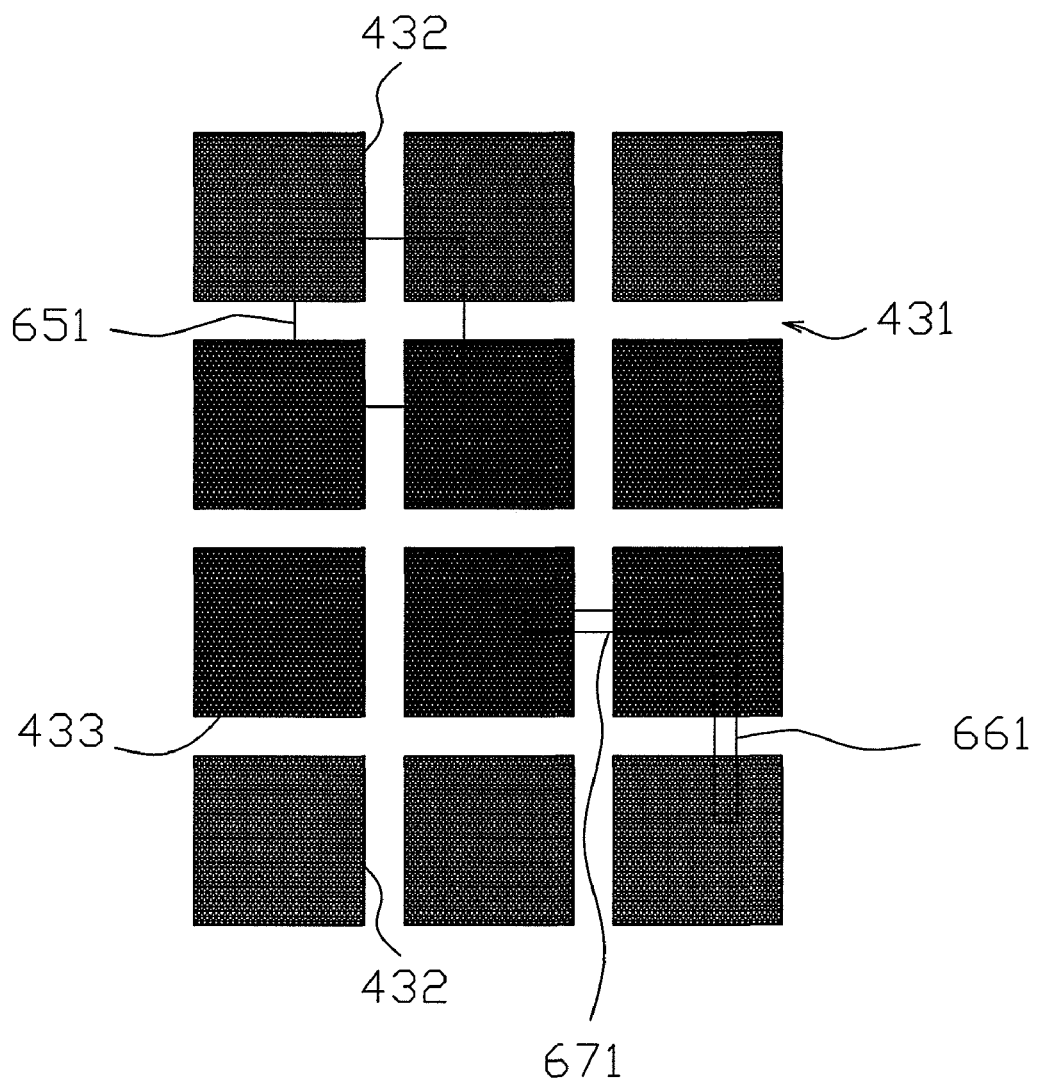
FIG. 10B shows a test chart according to one embodiment of the invention.

FIGS. 10A to 10B respectively show a test chart according to one embodiment of the invention. As shown in FIG. 10A, the test chart 132a includes a plurality of squares 421. The borders 423 and 424 of the squares 421 respectively extend along the vertical direction and the horizontal direction. In order to obtain a relatively good test result, the squares 421 are opaque (black) and are disposed on a transparent (white) surface. As shown in FIG. 10B, the test chart 132b includes a plurality of cross areas 431. The borders 432 and 433 of the cross areas 431 respectively extend along the vertical direction and the horizontal direction. In order to obtain a relatively good test result, the cross areas 431 are opaque and are disposed on a transparent surface.

Figure 11A:
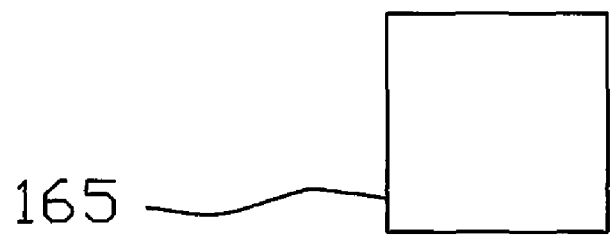
FIG. 11A shows a schematic diagram illustrating an image sensor according to one embodiment of the invention.
Figure 11B:
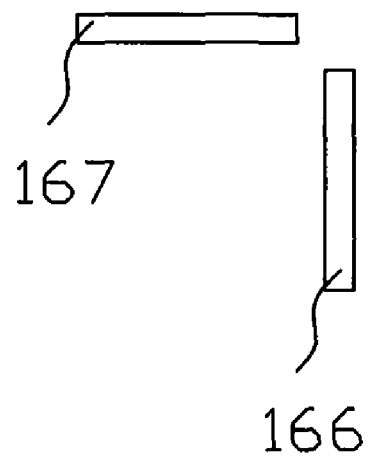
FIG. 11B shows a schematic diagram illustrating an image sensor according to one embodiment of the invention.

FIGS. 11A to 11B respectively show a schematic diagram illustrating an image sensor according to one embodiment of the invention. As shown in FIG. 11A, the shape of the image sensor may be a surface shape 165 such that the images of the area 651 in FIGS. 10A to 10B may be captured. As shown in FIG. 11B, the shape of the image sensor may comprise a first stripe 166 extending along the vertical direction and a second stripe 167 extending along the horizontal direction such that the images of the area 661 and 671 in FIGS. 10A to 10B may be captured.

The lens-testing test method according to this embodiment may test the properties of the lens device 160. The test method of using different test charts 132 in the light module 130 to calculate the characteristics of spatial frequency responses of the images captured by the image sensors is described in the following as an example. In one embodiment, as shown in FIG. 10A, the steps of analyzing the images corresponding to the test chart 132a may comprise the following steps (not shown). Step 42: calculating edge spread functions of the borders in the vertical direction and the horizontal direction. Step 43: calculating a line spread function by differentiating the edge spread functions. Step 44: calculating a spatial frequency response by conducting a fourier transform on the line spread function. In one embodiment, as shown in FIG. 10B, the steps of analyzing the images corresponding to the test chart 132b may comprise the following steps (not shown). Step 52: calculating a line spread function in the vertical direction and the horizontal direction. Step 54: calculating a spatial frequency response by conducting a fourier transform on the line spread function.

An object of an embodiment of the invention is to improve the convenience of a lens-testing apparatus or a lens-testing method, and to provide a lens-testing apparatus or a lens-testing method which is more efficient than the conventional one. In one embodiment, a reflector is disposed adjacent to a first image sensor having a short object distance. A second image sensor having a medium object distance is disposed at the place on which the light beam reflected by the reflector can be shed so that the light path is extended. A third image sensor module having a long object distance is disposed adjacent to the reflector. The third image sensor module includes a collimator capable of collimating the light and simulating an object distance at infinity. Consequently, the lens-testing apparatus and method may have third different object distances. In one embodiment, the image sensors (or image sensor module) and reflector may be disposed at a first displacement-generating device which can adjust the highs thereof so that the object distances are varied. In one embodiment, a control system is provided to satisfy different test requests in various modes.

Although the preferred embodiments of the present invention has been fully described by way of examples with reference to the accompanying drawings, it should not be construed as any limitation on the implementation range of the invention. Various equivalent changes and modifications can be performed by those who are skilled in the art without deviating from the scope of the invention. The scope of the present invention is to be encompassed by the claims of the present invention. Any embodiment or claim of the present invention does not need to reach all the disclosed objects, advantages, and uniqueness of the invention. Besides, the abstract and the title are only used for assisting the search of the patent documentation and should not be construed as any limitation on the implementation range of the invention.

What is claimed is:

1. An lens-testing apparatus being used for testing a lens device, the lens-testing apparatus comprising:
   a light module for generating a patterned light beam passing the lens device;
   at least one first image sensor for receiving a first portion of the patterned light beam;
   at least one second image sensor for receiving a second portion of the patterned light beam, wherein the first image sensor is disposed between the second image sensor and the lens device; and
   at least one image sensor module for receiving a substantially parallel third portion of the patterned light beam, and comprising a third image sensor and a collimator, wherein the substantially parallel third portion of the patterned light beam is focused onto the third image sensor by the collimator,
   wherein the distance between the first image sensor and the lens device is smaller than the distance between the second image sensor and the lens device.

2. The lens-testing apparatus according to claim 1 further comprising at least one reflector disposed between the second image sensor and the lens device, wherein the second portion of the patterned light beam is reflected by the reflector before received by the second image sensor.

3. The lens-testing apparatus according to claim 1, wherein the light module comprises:
   a light source for generating a light beam; and
   a test chart,
   wherein the light beam passes through the test chart and then becomes the patterned light beam formed by the test chart.

4. The lens-testing apparatus according to claim 1, wherein the third image sensor of the image sensor module is disposed on a focus plane of the collimator.

5. The lens-testing apparatus according to claim 1, wherein the image sensor module comprises a housing defining an opening such that the patterned light beam passing through the opening becomes the substantially parallel third portion of the patterned light beam; the third image sensor and the collimator are disposed in the housing; the collimator is disposed between the third image sensor and the opening.

6. The lens-testing apparatus according to claim 2 further comprising: a first displacement-generating device for moving at least one of the reflector, the first image sensor and the second image sensor relative to the lens device.

7. The lens-testing apparatus according to claim 6 further comprising:
   a control system being coupled to the first image sensor, the second image sensor and the third image sensor, wherein the control system receives the images corresponding to the first portion, the second portion and the third portion of the patterned light beam and being captured by the first image sensor, the second image sensor, and the third image sensor to analyze the images.

8. The lens-testing apparatus according to claim 6, wherein the lens-testing apparatus further comprises a first loading platform and a second loading platform;

the first displacement-generating device comprises a first screw rod and a second screw rod;

the second image sensor is disposed on the first loading platform; the first loading platform is movably disposed at the second screw rod;

the first image sensor is disposed on the second loading platform; the second loading platform is movably disposed at the first screw rod;

the second loading platform is disposed between the lens device and the first loading platform.

9. The lens-testing apparatus according to claim 8 further comprising:

a fourth image sensor; and a second displacement-generating device disposed on the side surface of the second loading platform adjacent to the lens device, and being for optionally moving the fourth image sensor so that the fourth image sensor is optionally located between the second loading platform and the lens device.

10. The lens-testing apparatus according to claim 9 further comprising a control system, wherein the control system comprises:

an image controller coupled to the first image sensor, the second image sensor, the third image sensor and the fourth image sensor; and a host computer coupled to the image controller, receiving the images captured by the first, second, third and fourth image sensors through the image controller and then analyzing the images.

11. The lens-testing apparatus according to claim 8, wherein the second loading platform comprising at least one slide groove passing through the second loading platform; and at least one carrier movably disposed within the slide groove, wherein the reflector, the first image sensor and the image sensor module are secured on the carrier.

12. The lens-testing apparatus according to claim 11, wherein a plurality of carriers are movably disposed within the slide groove.

13. The lens-testing apparatus according to claim 8, wherein the first loading platform includes a plurality of slide rails, at least one of the first image sensors is disposed at one of slide rails.

14. The lens-testing apparatus according to claim 1, wherein the shape of the image sensors is a surface shape.

15. The lens-testing apparatus according to claim 1, wherein the shape of the image sensors comprises a first stripe extending along the first direction and a second stripe extending along the second direction and the first direction is perpendicular to the second direction.

16. An lens-testing method being for testing a lens device, the lens-testing method comprising:

(a) controlling a light module to generate a patterned light beam passing through the lens device, wherein a first portion of the patterned light beam is shed on a first image sensor; a second portion of the patterned light beam is shed on a second image sensor; and a substantially parallel third portion of the patterned light beam is shed on a image sensor module, wherein the image sensor module is used for simulating an object distance at infinity between the image sensor module and the lens device; and (b) using the first image sensor, the second image sensor and the image sensor module to capture the images corresponding to the patterned light beam, and analyzing the images to obtain the properties of the lens device.

17. The lens-testing method according to claim 16, wherein the second portion of the patterned light beam is reflected by a reflector before shed on the second image sensor.

18. The lens-testing method according to claim 17, wherein the (a) step further comprises the step of using a test chart to form the patterned light beam, and the test chart comprises a plurality of the borders extending along the first direction and the second direction perpendicular to the first direction.

19. The lens-testing method according to claim 18, wherein the (b) step further comprises:

calculating edge spread functions of the borders in the first direction and the second direction;

calculating a line spread function by differentiating the edge spread functions; and calculating a spatial frequency response by conducting a fourier transform on the line spread function.

20. The lens-testing method according to claim 18, wherein the (b) step further comprises:

calculating a line spread function in the first direction and the second direction; and calculating a spatial frequency response by conducting a fourier transform on the line spread function.

* * * * *